US012583175B2

(12) United States Patent (10) Patent No.: US 12,583,175 B2

Pulsipher (45) Date of Patent: Mar. 24, 2026

(54) MOLTEN LIQUID-MARBLES AND CURTAILING AGENT FOR FORMING 3D PARTS

(71) Applicant: Daniel John Verdell Pulsipher, Cary, NC (US)

(72) Inventor: Daniel John Verdell Pulsipher, Cary, NC (US)

( * ) Notice: Subject to any disclaimer, the term of this patent is extended or adjusted under 35 U.S.C. 154(b) by 542 days.

(21) Appl. No.: 17/945,583

(22) Filed: Sep. 15, 2022

(65) Prior Publication Data

US 2023/0016693 A1 Jan. 19, 2023

Related U.S. Application Data

(63) Continuation of application No. PCT/US2021/046601, filed on Aug. 19, 2021.

(60) Provisional application No. 62/706,467, filed on Aug. 19, 2020.

(51) Int. Cl.
| | |
|---|---|
| *B29C 64/165* | (2017.01) |
| *B33Y 10/00* | (2015.01) |
| *B33Y 70/00* | (2020.01) |
| *B29K 105/00* | (2006.01) |

(52) U.S. Cl.
CPC ............ *B29C 64/165* (2017.08); *B33Y 10/00* (2014.12); *B33Y 70/00* (2014.12); *B29K 2105/0038* (2013.01); *B29K 2995/0039* (2013.01); *B29K 2995/004* (2013.01)

(58) Field of Classification Search
CPC ..... B29C 64/165; B29C 64/153; B29C 64/10; B33Y 10/00; B33Y 70/00; B29K 2105/0038; B29K 2995/0039; B29K 2995/004
See application file for complete search history.

(56) References Cited

U.S. PATENT DOCUMENTS

| | | | |
|---|---|---|---|
| 7,515,986 | B2 | 4/2009 | Huskamp |
| 7,879,282 | B2 | 2/2011 | Hopkinson et al. |
| 8,535,036 | B2 | 9/2013 | Hopkinson et al. |
| 9,617,394 | B2 | 4/2017 | Evans et al. |
| 10,252,335 | B2 | 4/2019 | Buller et al. |
| 10,301,490 | B2 | 5/2019 | Emamjomeh et al. |
| 10,392,512 | B2 | 8/2019 | Emamjomeh et al. |
| 10,434,573 | B2 | 10/2019 | Buller et al. |

(Continued)

FOREIGN PATENT DOCUMENTS

| | | | |
|---|---|---|---|
| CN | 108025493 A | 5/2018 |
| WO | WO 2019/177612 A1 | 9/2019 |
| WO | WO 2019/236074 A1 | 12/2019 |

OTHER PUBLICATIONS

International Search Report and Written Opinion for application No. PCT/US2021/046601 dated Nov. 23, 2021.

(Continued)

*Primary Examiner* — JaMel M Nelson
*Assistant Examiner* — Erica Hartsell Funk
(74) *Attorney, Agent, or Firm* — KDW FIRM PLLC

(57) ABSTRACT

The present subject matter relates to a method for creating interconnected or continuous layers of material by using a heated powdered composition comprising base particles and an obstruction material and applying a curtailing agent to said powdered composition. The heated powdered composition may be held at a temperature higher than its melting or softening point and the obstruction material prevents particle-particle coalescence until the curtailing agent is applied.

20 Claims, 3 Drawing Sheets

(56) References Cited

U.S. PATENT DOCUMENTS

| | | | |
|---|---|---|---|
| 10,647,053 B2 | 5/2020 | Erickson et al. | |
| 2016/0304677 A1 | 10/2016 | Evans et al. | |
| 2017/0225396 A1 | 8/2017 | Howard et al. | |
| 2017/0246810 A1 | 8/2017 | Gold | |
| 2019/0047216 A1 | 2/2019 | Emamjomeh et al. | |
| 2020/0199383 A1 | 6/2020 | Prasad et al. | |

OTHER PUBLICATIONS

European Search Report for Application No. 21859104 dated Jan. 22, 2024.

Chinese Office Action in CN Application No. 202180061340.5 dated Jul. 4, 2025, 11 pages.

1

MOLTEN LIQUID-MARBLES AND CURTAILING AGENT FOR FORMING 3D PARTS

PRIORITY CLAIM

This application is a continuation of International Patent Application Serial No. PCT/US2021/046601, which was filed on Aug. 19, 2021, which itself claims priority to U.S. Provisional Patent Application Ser. No. 62/706,467, filed Aug. 19, 2020, the disclosures of which are incorporated herein by reference in their entireties.

TECHNICAL FIELD

The subject matter disclosed herein relates generally to methods, systems, and materials for forming three-dimensional structures using additive manufacturing principles. More particularly, the subject matter disclosed herein relates to methods, systems, and materials for powder bed fusion techniques.

BACKGROUND

The technologies for processing and shaping materials into desired shapes and components have significantly improved with the invention of new additive manufacturing (AM) or three-dimensional (3D) printing methods. Techniques for printing polymeric materials can be classified into categories of thermal extrusion, photopolymerization, powder bed fusion, material jetting, binder jetting, and lamination. Each of these categories have their benefits and drawbacks that can be debated, and many patents have been issued to try to address some of these weaknesses.

Powder bed fusion techniques are more widely used in industrial settings to produce end-use products. Selective laser sintering (SLS) is faster, achieves better resolutions and more coherent parts than FDM, yet SLS requires powdered starting materials to be semicrystalline and therefore it has material limitations that FDM does not have. Material jetting techniques such as Polyjet perform ink jet type printing of UV curable resins. The parts it creates suffer from comparatively poor strength, and large parts build up internal stresses from heat gradients. Powder bed techniques are more conducive to longer build times and larger builds in terms of reducing part warping and internal stresses.

Ideally, the best AM techniques would be fast, accurate, have good resolution, allow for the creation of large unwarped parts, and would accept a large variety of printable materials. The AM technique would combine the material selection of thermal extrusion methods with the added benefits of powder-bed base methods without relying on a rastering laser to fuse polymeric particles together. Hewlett Packard's (HP) U.S. Pat. Nos. 10,301,490 and 10,647,053 describe a powder-bed based AM method, which uses inkjet print heads to selectively add fusing and detailing agents to aid and prevent particle coalescence under infrared heating lamps avoiding the use of lasers, and yet this method is still lacking in a large selection of available printable materials. HP's U.S. Patent Application Publication No. 2020/0199383 and 2019/0047216 highlight a coalescing and a fusing agent which relies on an electromagnetic radiation absorbing material such as carbon black to aid in forming 3D printed layers of material. Neil Hopkinson et al. (U.S. Pat. Nos. 7,879,282 and 8,535,036) also developed a method for printing a radiation absorbent material to aid in selectively heating the powdered particles into coalescence. Using a pigment or dye as a radiation absorber material limits the color of the particles being printed and proves to be problematic when multiple different colors are to be printed at the same time since each color will absorb different amounts of this irradiation and will therefore be at different temperatures.

When using semicrystalline materials in current powder-bed based AM techniques, having precise control of temperature is important and many patents are based on controlling and monitoring temperature during the build process for this reason (U.S. Pat. Nos. 7,515,986; 2017/0246810 and 10,434,573). It would be beneficial to have a powder-based AM method that decouples some of the importance of having precise temperature control. Publication No. 2020/0199383 also mentions the possibility of using the process with amorphous polymers in their printer, but this has not yet been sufficiently successful.

HP's U.S. Pat. No. 10,392,512 describes its detailing agent that is used to prevent radiation adsorption and to help keep specific sections of the powdered particles cool to prevent them from coalescing. This is a reason why semicrystalline particles are easier to work with since both molten and non-molten particles can be next to each other without significantly coalescing. A limitation to using amorphous polymers is that they do not have a sharp melting point or a point where their viscosity drops dramatically. Higher temperatures and/or chemical modifiers such as plasticizers are required to get amorphous polymers to flow and coalesce into layers with higher strength and less porosity. A powder-based AM method that allows for large differences in temperature between coalesced and uncoalesced polymeric particles and has the ability to keep softened or tacky polymeric particles from coalescing would help solve this problem.

To improve powder-bed based AM processes, Evans, Pulsipher, and Stockton discuss in U.S. Pat. No. 9,617,394 a method of coating particles for 3D printing. The particles are plasma coated to allow them to withstand temperatures above their melting point without significant particle adhesion until the coating is thermally or mechanically breached. Most materials of interest in AM have a low coefficient of thermal expansion. This limits the ability of the particles to expand with thermal stimulus to crack open or rupture the coating. A different process is needed that does not involve a chemically attached coating or merely chemically changing the surface of the particles to be coalesced. A method is also needed to more effectively breach the coating and release the molten polymer without mechanical intervention.

In an AM application, or more specifically in powder-bed fusion techniques, it would be ideal to use a barrier that prevents particle-particle coalesce, if the barrier could be quickly and easily expunged in precise areas to allow the particles to coalesce. The remnants of the expunged barrier would be small and/or incorporate well into the polymeric matrix as to not significantly adversely affect the end material's mechanical properties. Further, it would be beneficial if the barrier was thermally insulating to induce some thermal isolation between the neighboring barriered particles from particles that have already been fused or coalesced and are at a higher temperature. This added insulation would allow greater differences in temperature between non-melted and melted portions of the powdered bed. Such a method would also open up the possibilities of having more materials including amorphous polymers, compounded polymers, or combinations of materials processable in powder-bed based AM techniques.

SUMMARY

To address the deficiencies of the prior art, the invention describes a method of creating interconnected or continuous layers of material by the use of a heated powdered composition and application of a curtailing agent to the powdered composition. The powdered composition comprises powdered base particles and an obstruction material situated around and/or between the base particles. When the powdered composition is raised to or held at a temperature elevated near or above the first melting or softening point of said base particles in the powdered composition, the obstruction material prevents the base particles in the powdered composition from spontaneously coalescing. The obstruction material at least partially obstructs said base particles from significantly combining with or coalescing with neighboring base particles to prevent the formation of significantly larger particles or the formation of an interconnected or continuous layer of material. The curtailing agent comprises a chemical that aids in allowing the base particles to at least partially coalesce with neighboring similar base particles by acting as a temporary plasticizer to increase the mobility of the base particles; or the curtailing agent aids in at least partially diminishing, dispersing, and/or allows thermal bridging of the obstruction material contained in the powdered composition at the location where the curtailing agent was applied. An example of this method is represented in the diagram in FIG. 1.

In some embodiments, the obstruction material has a surface functionalization affixed that will prevent significant incorporation into the molten base material. The surface functionalization can be a hydrophobic or omniphobic functionalization. The curtailing agent can also contain a dispersing agent or agents to allow remnants of the expunged material to incorporate better into the resulting polymer matrix.

In other embodiments, the obstruction has the added benefit of providing thermal insulation to the particles in order to allow larger differences in temperature between insulated particles and coalesced particles. Thermally insulating materials with a thermal conductivity lower than 0.09 W/m·K can provide a suitable isolation among and between the base particles, and materials having a thermal conductivity lower than 0.03 W/m·K, such as an aerogel, can be particularly effective in this regard. The size of the obstruction material may be on the same order of magnitude as the base particle or smaller with the goal of using the least amount of obstruction as possible to prevent significant circumvention of the obstruction material by the base particles, while not adversely affecting the mechanical properties of the created coalesced continuous part in a significant way. Here a significant adverse effect of elongation at break could be as small as 5% in for example nylon 12 materials or as high as a 20% reduction in other materials. The obstruction material may be particles that are 0.005-50 μm in diameter. They can also be as small, or as thin as a surface functionality which is directly attached to the surface of the base particles.

In some embodiments, the base particles which are a part of the powdered composition are semicrystalline materials that have a melting point, and yet the base particles can also be more amorphous type materials with a glass transition temperature. More amorphous materials are possible with the invention since the powdered composition may be held at temperature in excess of 5-150° C. or higher over the melting point, glass transition temperature, or softening point of the base particles.

In some embodiments, the curtailing agent comprises a chemical that acts as a temporary plasticizer or aids in partially diminishing or dispersing the obstruction in one or all of the following means: 1) acting as a surfactant or solvent to collapse, break-up, solvate, or mask the hydrophobic properties of the obstruction material and aid them in mixing into the coalescing base matrix; 2) creating a thermally conducting bridge between the particles which were insulated by the use of the obstruction; and 3) increasing the mobility of the softening or molten polymer chains composing the isolated particles by acting as a plasticizer. The curtailing agent need not remain in the coalesced material. The controlled evaporation of the majority of the curtailing agent can aid in the removal of the obstruction material while not adversely affecting the mechanical properties of the coalesced continuous part in a significant way.

In some embodiments, the curtailing agent is applied in liquid form. The liquid may be applied in drops which are smaller in diameter than ten times the average diameter of the base particles used. The liquid may be applied by an ink jetting or drop on demand (DOD) method.

In other embodiments, the curtailing agent can also be solidified when applied to the hot powdered composition. As the curtailing agent's temperature reaches that of the powdered composition, the agent melts and helps to partially diminish or disperse the obstruction material. The temperature of the powdered composition may be varied to aid in melting or evaporating the curtailing agent as well as to aid in better polymer particle coalescence.

In some embodiments, the material set comprising of base particles, an obstruction material and a curtailing agent are specific to a material to be printed. Only certain curtailing agents will work with certain base particles.

In some embodiments, this method of forming an interconnected or continuous layer of material may be applied multiple times to create a 3D part from the combined layers. Multiple base materials which have different melting or softening points may be simultaneously printed into one part. In addition, multiple curtailing agents which work better with certain base materials can be applied simultaneously.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides methods, systems, and materials for forming three-dimensional structures using additive manufacturing principles. Interconnected or continuous layers of material are created by the use of a heated powdered composition, and the application of a curtailing agent to the powdered composition. The powdered composition comprises powdered base particles and an obstruction material situated around and/or between the base particles. When the powdered composition is raised to or held at a temperature elevated near or above the melting or softening point of said base particles in the powdered composition, the obstruction material prevents the base particles in the powdered composition from spontaneously coalescing. The obstruction material at least partially obstructs said base particles from significantly combining with or coalescing with neighboring base particles to prevent the formation of significantly larger particles or the formation of an interconnected or continuous layer of material. The curtailing agent comprises a chemical that aids in allowing the base particles to at least partially coalesce with neighboring similar base particles by acting as a temporary plasticizer; or the curtailing agent aids in at least partially diminishing, dispersing, and/or allows thermal bridging of the obstruction material contained in the powdered composition at the location where the curtailing agent was applied.

Figure 1:
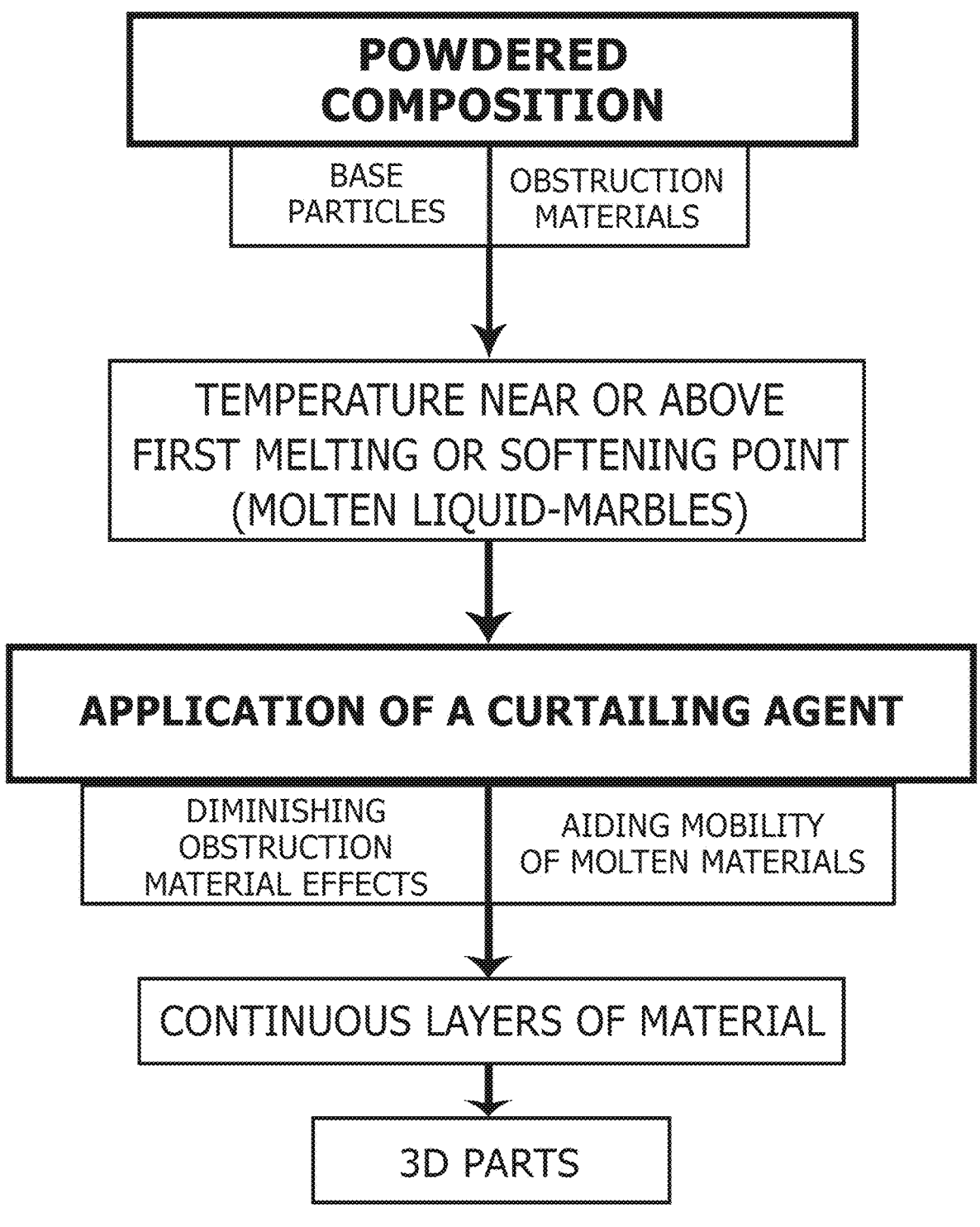
FIG. 1 is a flow diagram illustrating an example of the method disclosed herein.

In one aspect, the present subject matter provides a method of creating interconnected or continuous layers of material by the use of a heated powdered composition and application of a curtailing agent to the powdered composition. An example of this method is represented in the diagram in FIG. 1. The powdered composition comprises powdered base materials and an obstruction material situated around and/or between the base particles. In some embodiments, the base particles are composed of polymeric materials. When the powdered composition is raised to or held at a temperature above the melting point or significantly above the softening point of the base particles, the base materials could form liquid marbles which are formed by a molten material, but the obstruction material at least partially obstructs the base particles from significantly combining with or coalescing with neighboring base particles to prevent the formation of significantly larger particles or the formation of an interconnected or continuous layer of material.

To selectively allow these "molten liquid-marbles" to coalesce into a desired arrangement, the curtailing agent is added to substantially overcome the ability of the obstruction material to keep the base particles separated at the location where the curtailing agent is applied. The curtailing agent comprises a chemical that aids in allowing the base particles to at least partially coalesce with neighboring similar base particles either by acting as a temporary plasticizer to increase the mobility of the base particles or by aiding in at least partially diminishing, dispersing, and/or allowing thermal bridging of the obstruction material contained in the powdered composition.

To obstruct the base particles from significantly combining or coalescing together, the obstruction material is configured to prevent significant incorporation into the molten base particles and to prevent nearby base particles from incorporating with each other. In this regard, in some embodiments, the obstruction material has a surface functionalization affixed that will prevent the base particles from fully wetting the obstruction material or from significant incorporating into the molten base material. A material is completely wetted by a liquid when a drop of a liquid is placed on the surface the material creates a surface contact angle of 0 degrees. If the surface contact angle is between 0-90 degrees, then the surface is wettable. In some embodiments, the obstruction material includes nanoparticles with a hydrophobic or omniphobic surface which may prevent significant bonding with neighboring particles in a similar manner to the formation of liquid marbles. Such functionality can be provided in compositions in which the obstruction material is present in an amount of 0.5-30 wt. % in said powdered composition. Powdered compositions with low incorporation (0.5-2 wt. %) of the obstruction material are preferred to limit detrimental mechanical properties in the created 3D part, and yet some base particles with less surface energy will require higher amounts of obstruction material to prevent coalescence. Higher amounts of obstruction material may also be required as higher temperatures are needed to significantly soften, for example, amorphous polymers. The hydrophobic treated nanoparticles can be any particle that will not significantly degrade important properties of the coalesced film or created 3D part. The obstruction material can include organic, metallic, or ceramic particles which can withstand the high temperatures used and which prevent the base particles from coalescing.

The size of the obstruction material may be on the same order of magnitude as the base particle or smaller with the goal of using the least amount of obstruction as possible to prevent significant circumvention of the obstruction material by the base particles, while not adversely affecting the mechanical properties of the created coalesced continuous part in a significant way. In some embodiments, for example, the obstruction material may be particles that are 0.005-50 µm in diameter. They can also be as small, or as thin as a surface functionality which is directly attached to the surface of the base particles.

In particular, in some embodiments, the obstruction material comprises particles which are insulating or porous to allow larger differences in temperature between insulated particles and coalesced particles. In some embodiments, for example, the obstruction material can include thermally insulating materials with a thermal conductivity lower than 0.09 W/m·K, and materials having a thermal conductivity lower than 0.03 W/m·K can be particularly effective in this regard. Hollow glass microspheres and porous ceramic particles are some examples of obstruction materials with thermal conductivity closer to 0.09 W/m·K. Examples of materials with conductivities lower than 0.03 W/m·K are those materials classified as foams and aerogels. Aerogels have some of the lowest thermal conductivities known with 0.03-0.004 W/m·K achievable. Obstruction materials with these low thermal conductivities and low densities will allow molten particles to be next to non-molten particles for longer times. Particulate ceramic aerogel materials are well-suited for this purpose. Aerogel materials are notorious for not being very strong mechanically, as their structure can even be destroyed or degraded by the capillary forces of water. This is one reason why most silica aerogel materials have a hydrophobic treatment. For use in the present systems and methods, however, the fragility of the low density aerogel structure may be taken advantage of and the structural degradation of the aerogel is encouraged after application of the curtailing agent.

Regardless of the particular composition or configuration of the obstruction material, using the ability to limit bonding of the base particles when exposed to a temperature above the melting point or significantly above the softening point of the base particles, the types of base particles that can be used in powder bed fusion techniques of this kind can be varied beyond the semicrystalline materials for which previous systems were limited. In this regard, in some embodiments, the base particles in the powdered composition are semicrystalline or amorphous type polymeric materials. As used herein, the term "polymeric particles" refers to both semicrystalline and amorphous polymers in particulate form that becomes pliable or moldable above a specific temperature (the glass transition temperature or the melting point) and solidify upon cooling below a specific temperature. These polymeric materials may include, but are not limited to: (PA) polyamides; polyetherimides (PEI); polycarbonates (PC); polyetheretherketones (PEEK); polyethylenes (PE); polyphenylene oxides (PPO); polyethylene terephthalates (PET); polyphenylene sulfides (PPS); polyethersulfones (PESU); acrylonitrile butadiene styrenes (ABS); polyoxymethylenes (POM); polylactic acids (PLA); polybenzimidazoles (PBI); polypropylenes (PP); polystyrenes (PS); polyvinyl chlorides (PVC); fluoropolymers (e.g., polytetrafluoroethylene). As used herein, the term "semicrystalline polymer" is a polymer which contains a significant degree of crystallinity or about 10% to about 80%. As used herein, the term "amorphous polymer" is a polymer that does not contain a significant degree of detectable crystalline structure. In some embodiments, compounded polymeric particles are used and combinations of polymeric particles with different melting or softening points are in the same process. Although various polymeric particles are discussed herein, those having ordinary skill in the art will recognize that any of a variety of other types of materials that soften or melt at elevated temperatures can be used as the base particles in the present systems and methods. In other embodiments, for example, the base particles in the powdered composition are metallic or alloyed particles.

With any type of base particles, the powdered composition can be held at temperature in excess of 5-150° C. or higher over the melting point, glass transition temperature, or softening point of the base particles. Processing powderbed-based materials at higher temperatures allows amorphous polymeric particles to be brought into a more optimal processable range where the polymer's higher melt flow rate will be more liquid-like. These higher temperatures will allow better mechanical properties of coalesced parts since the once separated molecular chains will have had more time to intermingle into an interconnected network of molecular chains before solidifying. Higher melt flows and better interconnected material networks will also increase coalesced part densities. The higher temperatures of the process are limited by the thermal decomposition or oxidation of the base particles being processed, and a curtailing agent composition available to function at said temperatures without significantly degrading. By controllably releasing molten liquid-marbles with a curtailing agent, more materials are available to process with powder bed-based AM techniques.

In other embodiments, less extreme temperatures may be used, or temperatures that are near or only slightly higher than the materials melting or softening point. This allows a larger processing window and therefore allows more polymeric materials to be processable with powder bed-based AM techniques. This also reduces the amount of obstruction material necessary to keep the particles from coalescing. A curtailing agent will help particles coalesce even with little to no obstruction material. Just the use of a curtailing agent will lower the required processing temperature since the curtailing agent helps to temporarily plasticize the particles.

Depending on the selected base particles and obstruction material, the curtailing agent can be selected to control the interconnection of the base particles. In some embodiments, for example, the curtailing agent may act as a surfactant or solvent to collapse, break-up, solvate, or mask the hydrophobic properties of the obstruction material and aid them in mixing into the coalescing base matrix. The curtailing agent may comprise a combination of additives and surfactants to for example: incorporate omniphobic particles into the polymeric matrix, suppress violent boiling, prevent polymer degradation, or prevent polymer oxidation.

In some embodiments, the curtailing agent creates a thermal bridge over the obstruction material. The thermal conductivity of most solvents range between 0.1 to 0.6 W/m·K which is at a minimum, five times greater than the thermal conductivity of the aerogel particles. Hot curtailing agent allows the polymeric particle to heat up faster and coalesce. After the particles coalesce, the temperature of the molten layer need not be as hot as the layer above it which will be coalesced next. Thus, the particles may only temporarily be exposed to high temperatures.

In some embodiments, the curtailing agent increases the mobility of the softening or molten polymer chains composing the isolated particles by acting as a plasticizer. Traditionally plasticizers are chemicals which are used to increase the pliability and ductility of a polymer. Their migration, mobility, and volatility after being incorporated into the polymer are all usually unwanted features. Chemicals as simple as water can act as plasticizers for many nylon materials. As used herein, the term "plasticizer" is used as a term that focuses on the chemical's function of adding mobility to the polymer chains in order to increase the polymer's melt flow rate. This enhanced mobility only needs to last until the polymer is sufficiently coalesced. Thereafter, it is preferred that the plasticizer mostly evaporates and removes itself from the polymer matrix.

Plasticizers used herein may constitute traditional plasticizer chemicals which include, but are not limited to: trimellitates (e.g., trimethyl trimellitate and tri-(2-ethylhexyl) trimellitate), phthalates ((e.g., phthalate anhydride and esters of phthalate anhydride like diethyl phthalate), terephthalates, benzoates (e.g., chemicals derived from benzoic acid like methyl benzoate, ethyl benzoate, propyl benzoate and dibenzoates), polyethers, sulfonamides, alkyl citrates and derivatives thereof. Other chemicals may be used with the present systems and methods which also temporarily increase the mobility of the polymeric chains and act as a temporary plasticizer which include, but are not limited to: propylene carbonate, naphthalene, anthracene, triphenylphosphine, benzophonone, xylene, high temperature siloxanes (e.g., phenylmethylsiloxane) and derivatives thereof.

In some embodiments, the curtailing agent is applied in liquid form. In some embodiments, the curtailing agent may be applied in droplets of controllable size. The liquid can be applied by an ink jetting or another drop on demand (DOD) method. In some embodiments, for example, an inkjet head can be configured for delivering drops of a liquid of controllable volumes, such as by using a piezoelectric mechanism. The inkjet head may be heated to facilitate delivery of curtailing agent and its components which are solid at room temperature. Drop sizes must be large enough to allow the curtailing agent time to work before it evaporates, but drops too large will result in bubbles and voids left in the coalesced polymer. In some embodiments, for example, the drops of curtailing agent can be smaller in diameter than ten times the average diameter of the base particles used. There are also other thermal based inkjet technologies that may be used to deliver controllable drops of curtailing agent to specific areas of the powder bed.

In other embodiments, the curtailing agent can be provided in a solidified form when applied to the hot powdered composition. As the curtailing agent's temperature reaches that of the powdered composition, the agent melts and helps to partially diminish or disperse the obstruction material. Solid curtailing agents can be of particular utility when used with metallic or alloyed base particles which require higher temperatures to melt or soften the base particles. In such embodiments, the curtailing agent can be selected to be thermally stable enough at the elevated temperature corresponding to the melting or softening points of the base particles to allow coalescence of the metallic or alloyed base particles before evaporating. The temperature of the powdered composition may be locally modified to aid in melting or evaporating the curtailing agent as well as to aid in better base particle coalescence.

After the curtailing agent has been selectively applied to achieve the desired interconnection of the base particles, the curtailing agent can be removed from the coalesced material. For example, in some embodiments, the controlled evaporation of the majority of the curtailing agent can aid in the removal of the obstruction material while not adversely affecting the mechanical properties of the coalesced continuous part in a significant way.

For any selected combination of base particles, obstruction material, and curtailing agent, the present systems and methods can be used to create 3D parts from combined layers of coalesced material. In some embodiments, this method of forming an interconnected or continuous layer of material may be applied multiple times to create a 3D part from the combined layers. Multiple base materials which have different melting or softening points maybe simultaneously printed into one part. In addition, multiple curtailing agents which work better with certain base materials can be applied simultaneously. Although laser irradiation is not required to coalesce the polymeric material, laser irradiation may aid in creating better parts. Laser irradiation may help with incorporating multiple materials with different melting or softening points in one part.

In some embodiments, the material set comprising of polymeric particles, an obstruction material, and a curtailing agent are specific to a material to be printed. Certain curtailing agents can work better with certain polymeric particles since different chemicals have varying abilities of plasticizing certain polymeric materials. For example, a propylene carbonate would not plasticize or help a PEEK polymeric particle coalesce with its neighbor. It would simply evaporate too quickly leaving the particles unchanged.

In some embodiments, the powdered composition may be processed under a vacuum. In order to achieve the lowest thermal conductivities of aerogel particles, they may be put in a vacuum. Performing this method under even a slight vacuum would also help to collect vapors of the curtailing agent for safety and reuse. In some embodiments, the vapors of the curtailing agent are collected, condensed, and recycled to be used in the processing and creation of more continuous layers of material.

EXAMPLES

The following examples are included to demonstrate preferred embodiments of the invention. The examples will aid those with skill in the art to recognize more enabling details of the invention. The procedures performed in the examples which follow represent procedures and techniques discovered by the inventor to demonstrate the function and practice of the invention. However, those of skill in the art should, in view of the present disclosure, appreciate that considerable alterations can be made in the specific embodiments while still obtaining similar results without departing from the scope and intent of the invention.

Example 1

Figure 2:
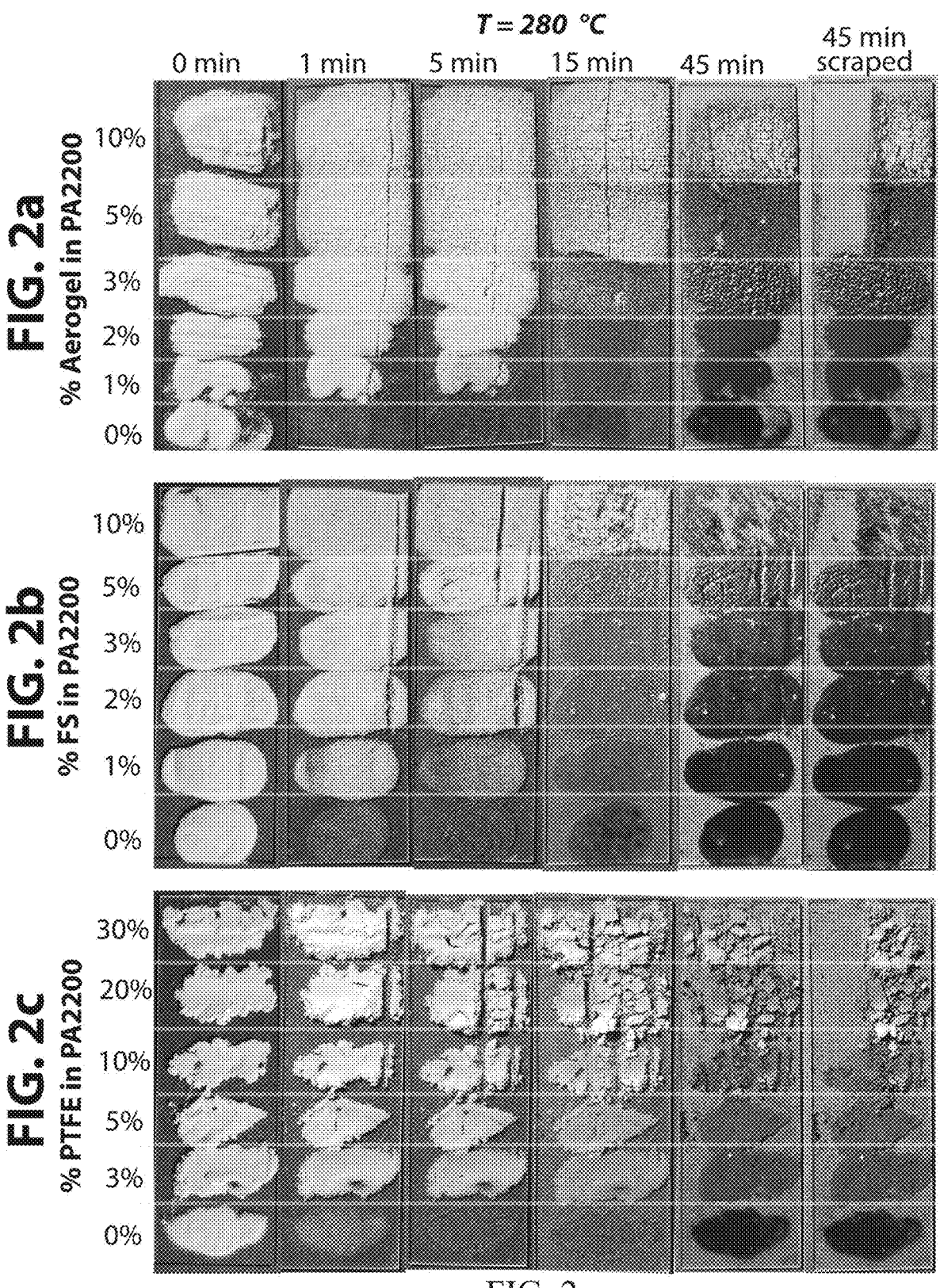
FIGS. 2A, 2B, and 2C depict the results of thermal testing of powdered compositions comprising polymeric particles using various materials as an obstruction material according to embodiments of the present subject matter.

The use of three different obstruction materials are presented in FIG. 2. The presence of these obstruction materials in a powdered composition allow the polymeric material to endure higher temperatures for longer amounts of time. FIG. 2a shows aerogel particles (D5), powdered particles from JIOS Aerogel, incorporated into used or recycled PA2200 (a PA-12 from Advanced Laser Materials) at 0, 1, 2, 3, 5, and 10% loadings. The powdered compositions were placed on a glass slide and then allowed to heat on a hot plate set to 280° C. The slide was allowed to heat to the designated time of 0, 1, 5, 15, and 45 minutes (min) after which the timer was stopped, the glass slide was removed from the heat and allowed to cool. A razor blade was then dragged across the surface of the room temperature powder after each time interval; if the powder was not already significantly fused together, the razor would make a line in the powder. The timer was resumed when the glass slide was placed back on the hot plate. The powdered composition containing only PA2200 powder, without any barrier particles, melted quickly after 1 min, since the PA2200 powder has a melting point of 172-180° C. and the hot plate is at least 100° C. over that melting point. After 5 min the polymeric particles in the 1% and 3% powdered compositions begin to coalesce and become larger polymeric flakes. After 15 min the 0, 1, 2, and 3% powdered compositions are fused together. After 45 min the 5% powdered composition begins to coalesce and fuse into larger flakes, yet both the 5 and 10% compositions are still loose and can be scraped from the substrate as shown in the image on the far right in FIG. 2a. This example simply demonstrates the benefits of using insulating and isolating particles of hydrophobic aerogel particles.

Example 2

Hydrophobic treated fumed silica (FS), Cabot TS-530, particles can also function as barrier particles in the powdered composition. They have a surface treatment to repel neighboring softened or melted particles, and they are somewhat insulative with their chained network of interconnected silica nanoparticles. FIG. 2b illustrates the loading percentages required to prevent PA2200 polymeric particles from significantly coalescing after time intervals of 1, 5, 15, and 45 min when held at a temperature 100° C. above its melting point. After 1 min of heating the 0% FS powdered composition of only PA2200 particles coalesced, and the 1% FS compositions also significantly coalesced since the blade could not part the powder. After 5 min of heating, the 0-3% FS compositions coalesced and only the 5% and 10% FS compositions remain powdered. After 15 min significant powder oxidation or browning occurs and only the 10% FS is moveable or scrapeable and yet it has begun to flake. At this 10% loading the PA2200 powder does not have enough polymeric material or a high enough melt flow rate to form a coalesced film with the PA2200 powder being spread out so thin. After 45 min none of the loadings were able to be easily scraped off of the glass slide (scrapeable). In comparison to the powdered compositions using D5 as the barrier material in FIG. 2a, a higher loading of FS and a shorter time at T=280° C. is required to keep the PA2200 powder from coalescing.

Example 3

Polytetrafluoroethylene (PTFE) particles FLUO 400SM from Micro Powders, can also function as barrier particles in the powdered composition. They have low surface energy and are more omniphobic to aid in repelling neighboring softening or melted particles. Although, their density is larger than the aerogel or fused silica particles and their thermal conductivity is significantly higher with PTFE thermal conductivities being on the order of 0.25 W/m K compared to the 0.02-0.03 W/m K of the aerogel. FIG. 2c shows how detrimental the larger loading of the PTFE can be in the powdered composition's dry flow. The higher loading compositions clump up more readily. In comparison to the powdered compositions using FS as the barrier material in FIG. 2b, the 5% PTFE composition coalesces before the 5% FS composition coalesces, but there is less volume of PTFE in the 5% PTFE composition than FS in the 5% FS composition due to the difference in the powders packing density. After 1 min the 3% and 5% PTFE compositions have fused. After 5 min the 10-30% PTFE compositions are still powder like. After 45 min only the 20% and 30% PTFE compositions are still scrapeable. Listed in order of effective obstruction materials for preventing particle coalescence of PA-12 particles, D5>FS>PTFE. Out of these limited materials experimented with so far, the obstruction material works best when it comprises D5 silica aerogel particles.

Example 4

Figure 3:
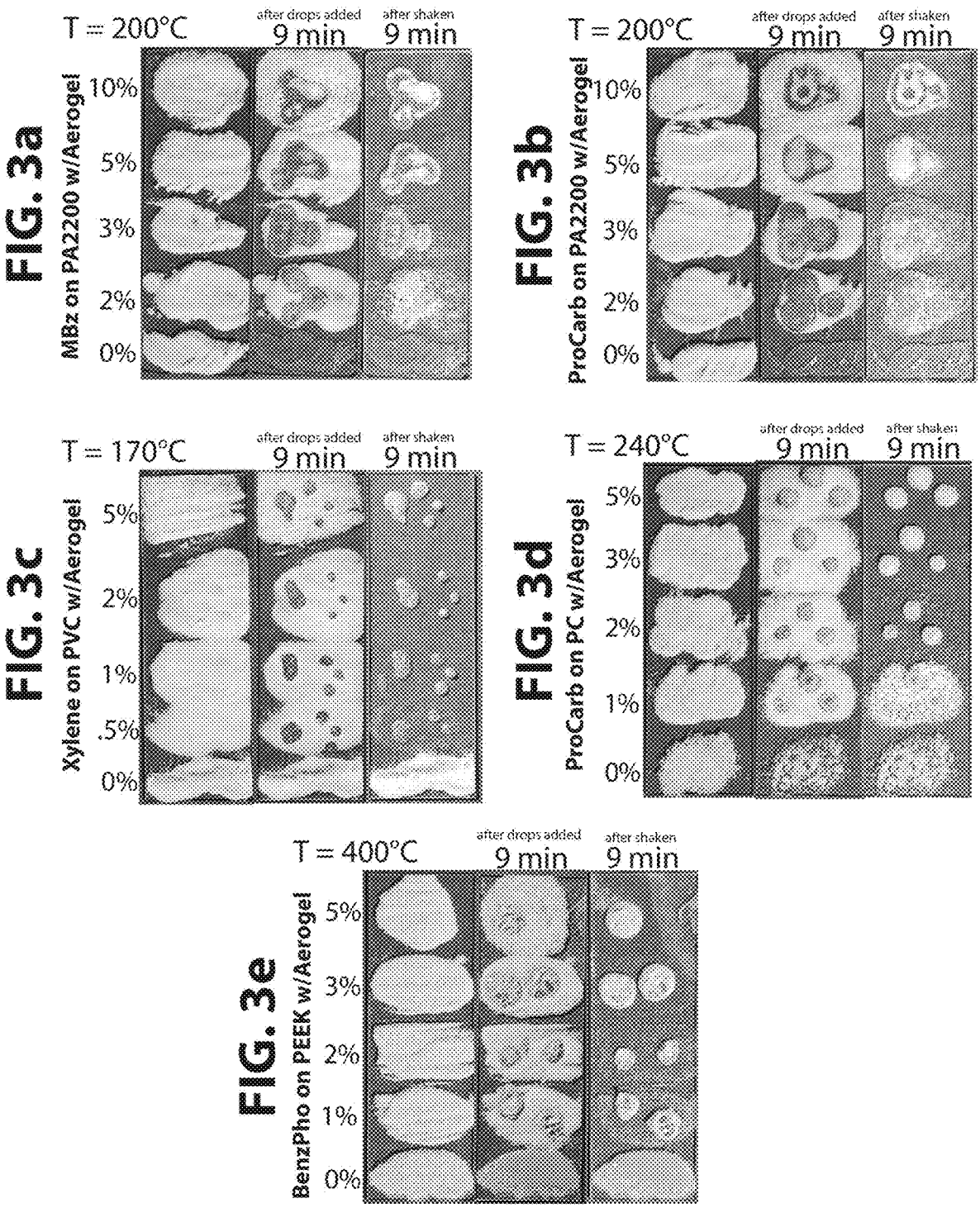
FIGS. 3A, 3B, 3C, 3D, and 3E depict the results of applying drops of various examples of curtailing agents to various powdered compositions held at elevated temperatures according to embodiments of the present subject matter.

Preventing the polymeric particles from coalescing or keeping them separated at temperatures higher than their melting or softening point is only part of the answer. A curtailing agent is used to coalesce the particles. FIG. 3, demonstrates some possible ingredients in a curtailing agent for use with various powdered compositions. The curtailing agents used corresponds to the chemistry of the system and temperature range in use. Clean glass slides were prepared with five different powdered compositions placed on them. The powdered compositions ranged from 0-10 wt. % of obstruction material. The glass slides were then placed on a heated hot plate that was set to the designated temperature which was above the melting or softening point of the polymeric particles comprised in the powdered compositions. The sides were held at their designated temperature for 5 minutes after which drops of the curtailing agent were applied to the powders with a pipette. After 9 minutes the glass slides were removed from the heated hot plate and allowed to cool to room temperature. Excess powder was then removed from the glass slides by shaking the powder off of the slides. The excess powder was not scraped off of the glass slides.

Methyl benzoate (MBz) from Southern Tier Scientific 99.9% pure, is an example of a curtailing agent that works with PA2200 polymeric particles as shown in FIG. 3a. The MBz evaporates over the course of a few minutes to leave the coalesced materials behind. The curtailing agent comprising of pure MBz works to aid the coalescence of powdered compositions ranging from 2-10% of D5. As the percentage of obstruction material increased in the powdered compositions, the coalesced polymeric films become easier to rip when cooled. Ideally, the least amount of obstruction material should be used to create stronger parts. As shown in FIG. 3a, the powdered composition remained free-flowing powder where the curtailing agent was not applied, and the powder was easily shaken off of the slide. As the percentage of obstruction material increased in the powdered compositions, less of the powder remained in areas where the curtailing agent was not applied.

FIG. 3b demonstrates the possibility of using propylene carbonate (ProCarb) from Southern Tier Scientific 99.9% pure, as a component of the curtailing agent. Less cracks and smaller bubbles are seen in the coalesced areas where the curtailing agent was applied for the 2% and 3% compositions than the 5% and 10% compositions. Specific curtailing agents will work better with specific polymers and powdered compositions. It is also of significance to note that if the curtailing agent is applied before the particles reach a temperature close to their melting or softening point and the temperature is raised to said point, the curtailing agent will simply evaporate and will not have enough time to aid in particle-particle coalescence.

Example 5

FIG. 3c demonstrates the possibility of using Xylene from Klean-Strip GXY24 Xylol, as a component of the curtailing agent. But more significantly it demonstrates the possibility of using amorphous materials with the invention. Poly vinyl chloride (PVC) powder from Vinnolit GmbH & Co. SA 1062/7 was used as the polymeric component of the powdered composition with 0%, 0.5%, 1%, 2%, and 5% of the composition being due to the obstruction material which was in this case D5 particles. It is of significance to note that less of the obstruction material was needed to keep the particles from coalescing. The 0.5% powdered composition also did not leave any significant amount of powder behind after the glass slides were shaken. The 0% powdered composition fused together after 9 min even though its surface did not smoothen out or turn translucent as much as the other 0% powdered compositions in FIG. 3.

Another amorphous polymer polycarbonate (PC) powder from Lexan 40, was used with a ProCarb based curtailing agent as shown in FIG. 3d. The powdered composition containing 2% and above of the obstruction material comprising D5, were sufficient to produce distinctively coalesced areas where the curtailing agent was applied. Other more significant amorphous powders can be used with the invention in a similar fashion.

To further demonstrate the significance of the invention, reground PEEK material, PEEK 450G MP140, was obtained from Polyclean Technologies, Inc to be used as the polymeric component of the powdered composition with 0%, 1%, 2%, 3%, and 5% of the composition being due to the obstruction material which was in this case D5 particles of silica aerogel as shown if FIG. 3e. In this case, a higher temperature component of the curtailing agent was used. Some of the main ingredients of the curtailing agent which are usable at the high temperatures required with materials similar to PEEK may be: phenylmethylsiloxane oligomer (PDM-7040), triphenylphosphine, anthracene, phthalic anhydride, benzophenone, and other high temperature chemicals may be used which mostly evaporate at the temperature of the coalescing film. Bezophone from Southern Tier Scientific was used as the main component of the curtailing agent in FIG. 3*e*. This example reveals how a high temperature polymeric material and curtailing agent can be used in this invention and one may conceivably apply this invention to high temperature amorphous polymers as well.

Due to the crude nature of placing large drops on the powders with a pipette, the large drops result in a large excess of curtailing agent being applied to the heated powdered compositions. Therefore, more curtailing agent will evaporate, and this results in the bubbles seen in images of the coalesced films. There are some methods to prevent these bubbles in the coalesced films that may be used and are considered under the scope of this invention. These methods may include, but are not limited to: using less curtailing agent; using various additives or mixtures in the curtailing agent or powder to slow or diminish the speed of evaporation; having a higher temperature on the top of the heated powdered composition than the bottom of the powdered composition; a second application of small amount of curtailing agent to keep the top surface more mobile; increasing the applied temperature over time; using thinner layers of powder to coalesce and other such methods. Not using enough curtailing agent would result in evaporation that happens too quickly before the film is able to benefit from the increased melt flow due to the plasticizing effect of the curtailing agent. Not using enough curtailing agent will also not allow significant time for thermal bridging to occur.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method for creating interconnected or continuous layers of material, the method comprising:
heating a layer of a powdered composition comprising base particles and a powdered obstruction material around or between the base particles, wherein the obstruction material at least partially obstructs the base particles from combining or coalescing together; and
when the layer of the powdered composition is raised to or held at an elevated temperature that is at or above a melting or softening point of the base particles, selectively applying a curtailing agent to the powdered composition;
wherein a melting or softening point of the obstruction material is higher than the melting or softening point of the base particles; and
wherein the curtailing agent comprises a chemical that aids the base particles to at least partially coalesce together at a location where the curtailing agent is applied by acting as a temporary plasticizer to increase the mobility of the base particles or by aiding in at least partially diminishing, dispersing, and/or allowing thermal bridging of the obstruction material contained in the powdered composition at the location.

2. The method of claim 1, wherein the obstruction material has chemical functionality on its surface that prevents the molten base particles from fully wetting the obstruction material.

3. The method of claim 1, wherein the obstruction material is present as a percentage of the powdered composition selected to obstruct the base particles from combining or coalescing together without significantly changing mechanical properties of a coalesced continuous part formed from the base particles after applying the curtailing agent.

4. The method of claim 1, wherein the obstruction material comprises an insulating material selected to have a thermal conductivity low enough to substantially prevent base particles from coalescing together at locations where the curtailing agent is not applied.

5. The method of claim 1, wherein the obstruction material comprises particles having a diameter selected to obstruct the base particles from combining or coalescing together without significantly changing mechanical properties of a coalesced continuous part formed from the base particles after applying the curtailing agent.

6. The method of claim 1, wherein the obstruction material comprises a coating or surface functionality deposited directly on the base particles.

7. The method of claim 1, wherein the base particles comprise a semicrystalline polymer.

8. The method of claim 1, wherein the base particles comprise an amorphous polymer.

9. The method of claim 1, wherein heating the layer of a powdered composition comprises holding the powdered composition at a temperature that is high enough over the melting point, glass transition temperature, or softening point of the base particles to allow the creation of interconnected networks of molecular chains before solidifying.

10. The method of claim 1, wherein the curtailing agent comprises a plasticizer, surfactant, or solvent which does not decompose at said elevated temperature.

11. The method of claim 1, comprising vaporizing excess curtailing agent at said elevated temperature.

12. The method of claim 11, comprising collecting vapors of the curtailing agent for safety and/or reuse.

13. The method of claim 1, wherein selectively applying the curtailing agent comprises applying the curtailing agent by printing, ink jetting, or by drop on demand technology.

14. A three-dimensional object comprising multiple layers of interconnected or continuous layers of material formed using the method of claim 1.

15. A material composition used in an additive manufacturing process which has a powdered composition comprising base particles being raised to an elevated temperature that is at or above a melting point, glass transition temperature, or softening point of the base particles without the base particles substantially combining or coalescing together at said elevated temperature, the material composition comprising;
a powdered composition comprising:
the base particles having the melting point, glass transition temperature, or softening point; and
a powdered obstruction material around or between the base particles, the obstruction material being configured to at least partially obstruct the base particles from combining or coalescing together at the elevated temperature; and
a curtailing agent configured to, when the layer of the powdered composition is raised to or held at the elevated temperature, aid the base particles to at least partially coalesce together at a location where the curtailing agent is selectively applied by acting as a temporary plasticizer to increase the mobility of the base particles or by aiding in at least partially diminishing, dispersing, and/or allowing thermal bridging of the obstruction material contained in the powdered composition at the location.

16. The material composition of claim 15, wherein the obstruction material comprises an insulating material selected to have a thermal conductivity low enough to substantially prevent base particles from coalescing together at locations where the curtailing agent is not applied;

and wherein the obstruction material has chemical functionality on its surface that prevents the molten base particles from fully wetting the obstruction material.

17. The material composition of claim 15, wherein the obstruction material is present as a percentage of the powdered composition selected to obstruct the base particles from combining or coalescing together without significantly changing mechanical properties of a coalesced continuous part formed after applying the curtailing agent.

18. The material composition of claim 15, wherein the base particles comprise a semicrystalline polymer.

19. The material composition of claim 15, wherein the base particles comprise a amorphous polymer.

20. The material composition of claim 15, wherein the powdered composition is configured to be held at a temperature that is high enough over the melting point, glass transition temperature, or softening point of the base particles to allow the creation of interconnected networks of molecular chains before solidifying.

\* \* \* \* \*